United States Patent [19]

Bleaney

[11] Patent Number: 5,135,207
[45] Date of Patent: Aug. 4, 1992

[54] SURFACE ALIGNMENT DEVICE

[76] Inventor: William J. Bleaney, 304 - 250 Island Highway, Parksville, British Columbia, Canada, V0R 2S0

[21] Appl. No.: 672,139

[22] Filed: Feb. 6, 1991

Related U.S. Application Data

[63] Continuation of Ser. No. 383,885, Jul. 28, 1989, abandoned.

[51] Int. Cl.⁵ .......................... B25B 11/00; B25B 1/20
[52] U.S. Cl. .......................................... 269/21; 269/43
[58] Field of Search ...................... 269/21, 37, 41, 43, 269/45, 58

[56] References Cited

U.S. PATENT DOCUMENTS

| | | | |
|---|---|---|---|
| 889,662 | 6/1908 | Coulter | 606/218 |
| 3,207,503 | 9/1965 | Clover et al. | 269/21 |
| 3,770,259 | 11/1973 | Wagreich | 269/21 |
| 4,341,375 | 7/1982 | Romanin | 269/43 |
| 4,361,316 | 11/1982 | Golz et al. | 269/43 |
| 4,674,730 | 6/1987 | Roberts | 269/43 |

*Primary Examiner*—J. J. Hartman
*Attorney, Agent, or Firm*—Fetherstonhaugh & Co.

[57] ABSTRACT

Apparatus for mutually aligning a pair of surfaces, e.g. kitchen counter-tops, has first and second groups of suction cups for gripping engagement with respective ones of the surfaces and a support structure connecting together said first and second groups of suction cups. The support structure includes adjustably laterally displacing the second group relative to the first group to thereby relatively displace the surfaces towards one another in a first direction at least substantially parallel to the surfaces and an adjustable abutment on the support structure for displacing one of the surfaces relative to the other in a second direction at least substantially perpendicular to the surfaces.

2 Claims, 2 Drawing Sheets

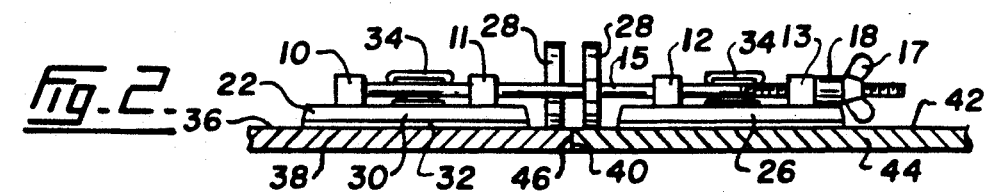
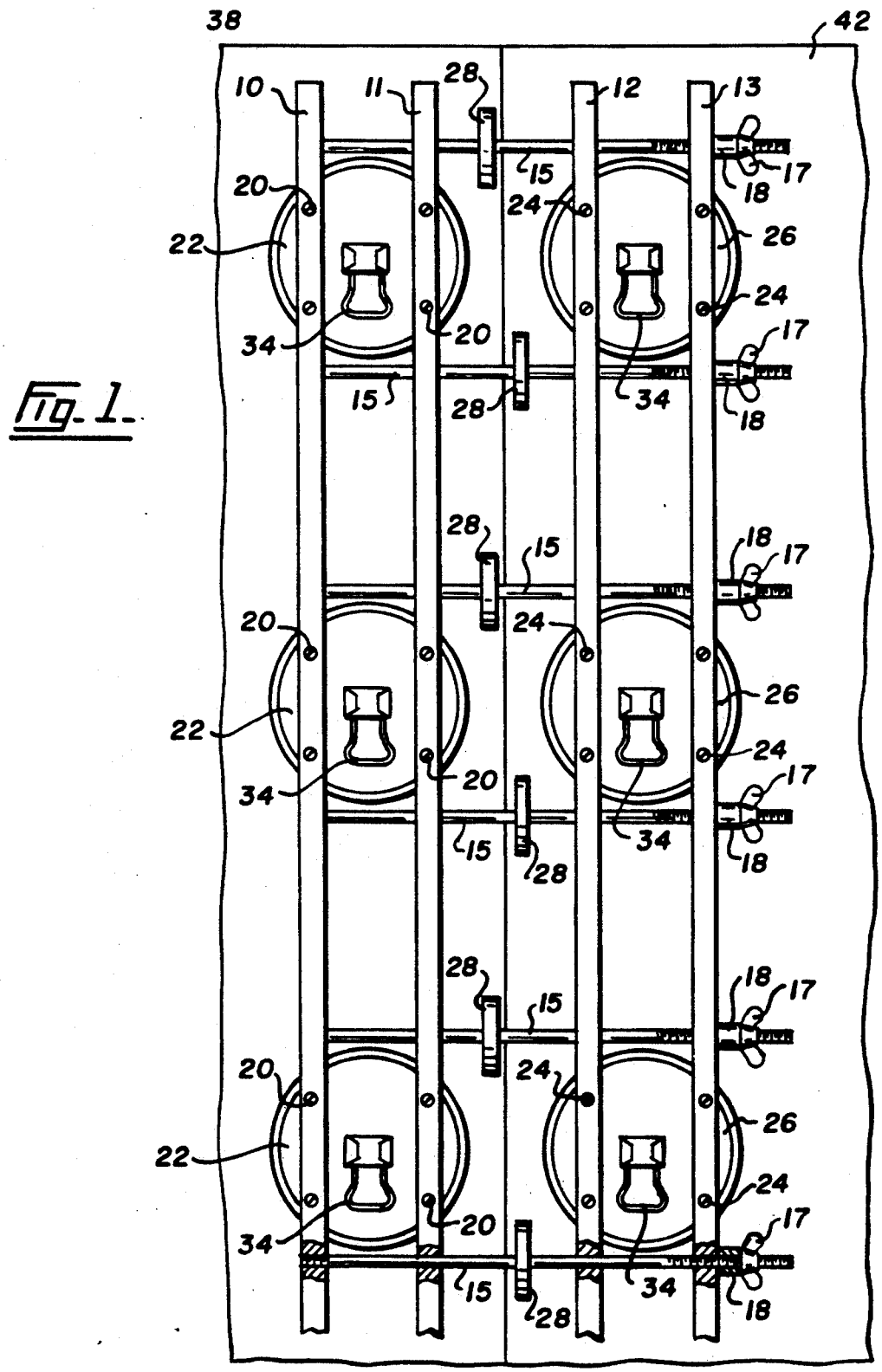

SURFACE ALIGNMENT DEVICE

This application is a continuation of application Ser. No. 383,885, filed July 28, 1989, now abandoned.

FIELD OF THE INVENTION

The present invention relates to an apparatus for mutually aligning a pair of surfaces and is useful in particular, but not exclusively, for aligning adjacent portions of a counter-top, so as to position such portions together with their surfaces flush with one another.

BACKGROUND OF THE INVENTION

At the present time, the conventional method employed for securing together adjacent portions of a counter-top is troublesome and time-consuming.

More particularly, the conventional method employed for this purpose requires a series of recesses to be routed in the underside of each of the counter-top portions. Clamping bolts are then inserted into these routed recesses, so as to extend beneath a joint line at which the counter-top portions abut one another. These clamping bolts are then tightened in order to urge the abutting edges of the counter-top portions against one another, while glue provided between these edges is allowed to set.

Not only is the routing of these recesses inconvenient and time-consuming but, in some cases, and as a result of obstructions beneath the counter-top, access to the routed recesses may be very difficult or even impossible.

Moreover, the routed recesses reduce the vertical thickness of the counter-top portions, thus introducing weakness into the finished counter-top.

BRIEF SUMMARY OF THE INVENTION

It is accordingly an object of the present invention to provide a novel and improved apparatus for mutually aligning a pair of surfaces which is simple and convenient to use.

It is a further object of the invention to enable a pair of surfaces to be aligned by apparatus in gripping engagement with the surfaces, without requiring access to any other part of the objects on which these surfaces are provided.

It is a still further object of the present invention to provide a novel and improved apparatus particularly useful for conveniently, quickly and simply securing together adjacent portions of a counter-top, with the surface of t he counter-top portions being readily adjusted into alignment with one another.

According to the present invention, there is provided apparatus for mutually aligning a pair of surfaces which comprises first and second means for gripping engagement with respective ones of these surfaces, means for connecting together the first and second gripping means, the connecting means including means for adjustably displacing the second gripping means relative to the first gripping means, and abutment means between the first and second gripping means for pressing one of the surfaces in position relative to the other of the surfaces.

More particularly, in the preferred embodiment of the invention the gripping means comprise sets of suction cups, and the connecting means comprise a support structure connecting the suction cups together in their groups. The means for adjustably displacing the second gripping means comprises an arrangement for displacing one of the groups of suction cups in a direction generally parallel to the surfaces relative to the other group or suction cups. This arrangement is particularly useful for urging together a pair of articles, having smooth, non-porous surfaces, for example portions of a counter-top, along a line of abutment at which a bonding agent or glue is provided for securing the articles together.

The abutment means preferably comprise an eccentrically rotatable abutment member for pressing against one of the surfaces in a direction generally perpendicular to the surfaces, so as to allow the surfaces to be brought flush to one another. This rotatable abutment member is preferably one of a plurality of such members spaced apart along the device so as to be able to act at locations correspondingly spaced apart along a line at which the surfaces meet.

BRIEF DESCRIPTION OF THE DRAWINGS

Further features, objects and advantages of the invention will be more readily apparent from the following description thereof when taken in conjunction with the accompanying drawings, in which:

FIG. 1 shows a plan view of a surface alignment device according to the present invention;

FIG. 2 shows a view in elevation of the device of FIG. 1;

THE PREFERRED EMBODIMENT

Figure 3:
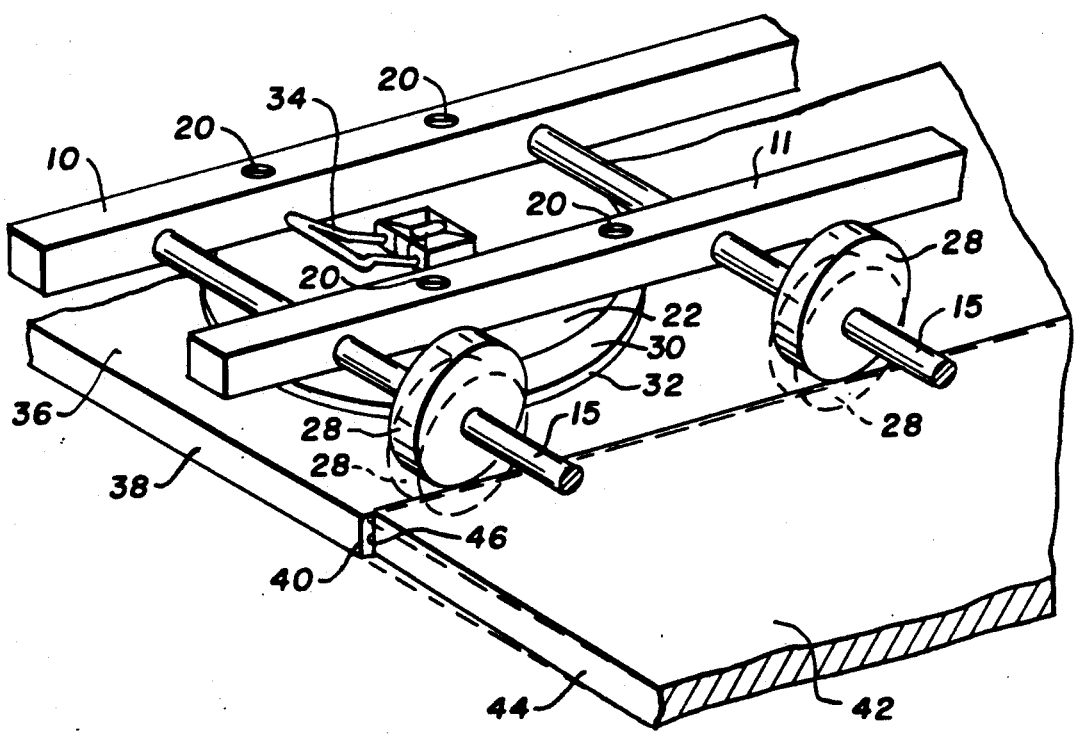
FIG. 3 shows a broken-away view in perspective of parts of the apparatus of FIGS. 1 and 2.

The surface alignment device shown in the drawings comprises a support framework formed by four parallel bars 10, 11, 12 and 13 extending longitudinally in the device, and a plurality of parallel rods 15 extending transversely of the device through the bars 10 through 13.

The transverse rods 15 extend through transverse borings in the bars 10 through 13 and are each secured, at one end thereof, to the bar 10. More particularly, the ends of the rods 15 are in tight threaded engagement with the bar 10 and are fixedly secured thereto by a spot weld (not shown), a grub screw (not shown) or other suitable means.

The rods 15 extend slidably through the bars 12 and 13, so that the bars 12 and 13 can be displaced along the rods 15, i.e. transversely of the device, by means of wing-nuts 17 in threaded engagement with the ends of the rods 15 remote from the bar 10. Spacer sleeves 18 are provided between the wing-nuts 17 and the bar 13.

The bars 10 and 11 are secured, by means of screws 20, to a three of suction cups 22, which form a first group or set of suction cups.

The bars 12 and 13 are likewise secured, by screws 24, to three suction cups 26, which form a second group or set of suction cups. Thus, the bars 10 and 11, together with the suction cups 22, form an assembly which is fixedly secured to the rods 15. On the other hand, the bars 12 and 13, with the suction cups 26, form a second assembly which is displacable along the rods 15 by means of the wing-nuts 17.

Each of the rods 15 is provided with an adjustable presser member or abutment 28, one of which is shown in greater detail in FIG. 3.

Each of the presser members 28 is in the form of a cam which is eccentrically rotatable about its respective connecting rod 15 and which, in addition, is slidably adjustable longitudinally of its respective connecting rod 15.

The suction cups 22 and 26 are conventional suction cups of a type normally employed by glaziers for carrying sheet glass, and each comprise an aluminum housing 30 containing a resilient, rubber suction member 32, each cup also being provided with an actuator lever 34.

In operation of the above device, the suction cups 22 are adjusted into gripping engagement with a surface 36 of a sheet material, for example a counter-top portion 38, at a spacing from an edge 40 of the latter.

The suction cups 26, after having been adjusted longitudinally of the rods 15, if necessary, are likewise brought into gripping engagement with the surface 42 of an adjacent sheet of material, for example a counter-top portion 44, at a spacing from the edge 46 of the latter, the edge 46 being located in abutment with the edge 40, and glue having been provided between the edges 40 and 46.

The presser members 28 are then slid along their respective connecting rods 15, is necessary, and adjustably rotated on their connecting rods, as necessary, to press against one or the other of the surfaces 36 and 42 until these two surfaces are brought into accurate, flush alignment with one another.

This operation is illustrated in FIG. 3, in which the presser member 28 is shown in full lines in an inoperative position, and in broken lines in an operative position, in which it is pressing against the surface 42 to displace the latter downwardly, i.e. in a direction perpendicular to the surfaces 36 and 42, to bring the surface 42 flush with the surface 36.

By tightening the wing nuts 17, and thereby displacing the bars 12 and 13, and, therewith, their associated suction cups 26 longitudinally along the rods 15, i.e. parallel to the surfaces 36 and 42, the adjacent edges 40 and 46 of the counter-top portions 38 and 44 are pressed together in tight abutment.

The two counter-top portions are thus firmly secured together, in accurate alignment with one another, until the glue has set, whereupon the suction cups 22 and 26 are released and the device is removed from the surfaces 36 and 42.

Various modifications may be made to the above-described embodiment of the invention within the scope of the appended claims. For example, each group or set of suction cups may comprise fewer or more than three suction cups, and the pairs of bars 10, 11 and 12, 13 may be replaced by a pair of one-piece support members.

Accordingly, the invention may vary within the scope of the appended claims.

I claim:

1. Apparatus for holding and mutually aligning first and second planar surfaces to be flush and abutting with one another, comprising:
   a plurality of first suction cup means for gripping engagement with the first surface;
   a plurality of second suction cup means for gripping engagement with the second surface;
   first rigid means for connecting said plurality of first suction cup means in spaced apart relationship to one another;
   second rigid means for connecting said plurality of second suction cup means in spaced apart relationship with respect to one another;
   a plurality of spaced apart means for adjustably connecting said first and second rigid means for displacement towards one another;
   a plurality of pressing means each of which is mounted on one of said adjustably connecting means for selectively pressing down on the first or the second surface and each of said pressing means comprising an abutment member eccentrically and slidably mounted on said adjustably connecting means and being eccentrically rotatable thereon.

2. Apparatus for holding and mutually aligning first and second planar surfaces to be flush and abutting with one another, comprising:
   a plurality of first suction cup means for gripping engagement with the first surface;
   a plurality of second suction cup means for gripping engagement with the second surface;
   first rigid means for connecting said plurality of first suction cup means in spaced apart relationship to one another;
   second rigid means for connecting said plurality of second suction cup means in spaced apart relationship with respect to one another;
   a plurality of spaced apart rods for adjustably connecting said first and second rigid means for displacement towards one another, said rods extending between said first rigid means and said second rigid means and being threaded at at least one end thereof such that rotation of a wing nut on said threaded end displaces said first rigid means and said second rigid means with respect to one another;
   a plurality of pressing means each of which is mounted on one of said rods for selectively pressing down on the first or the second surface and each of said pressing means comprising an abutment member eccentrically and slidably mounted on said rod means and being eccentrically rotatable thereon.

* * * * *